(No Model.)
W. T. JEBB.
PROCESS OF AND APPARATUS FOR MANUFACTURING DISTILLED SPIRITS FROM GRAIN.
No. 274,783. Patented Mar. 27, 1883.
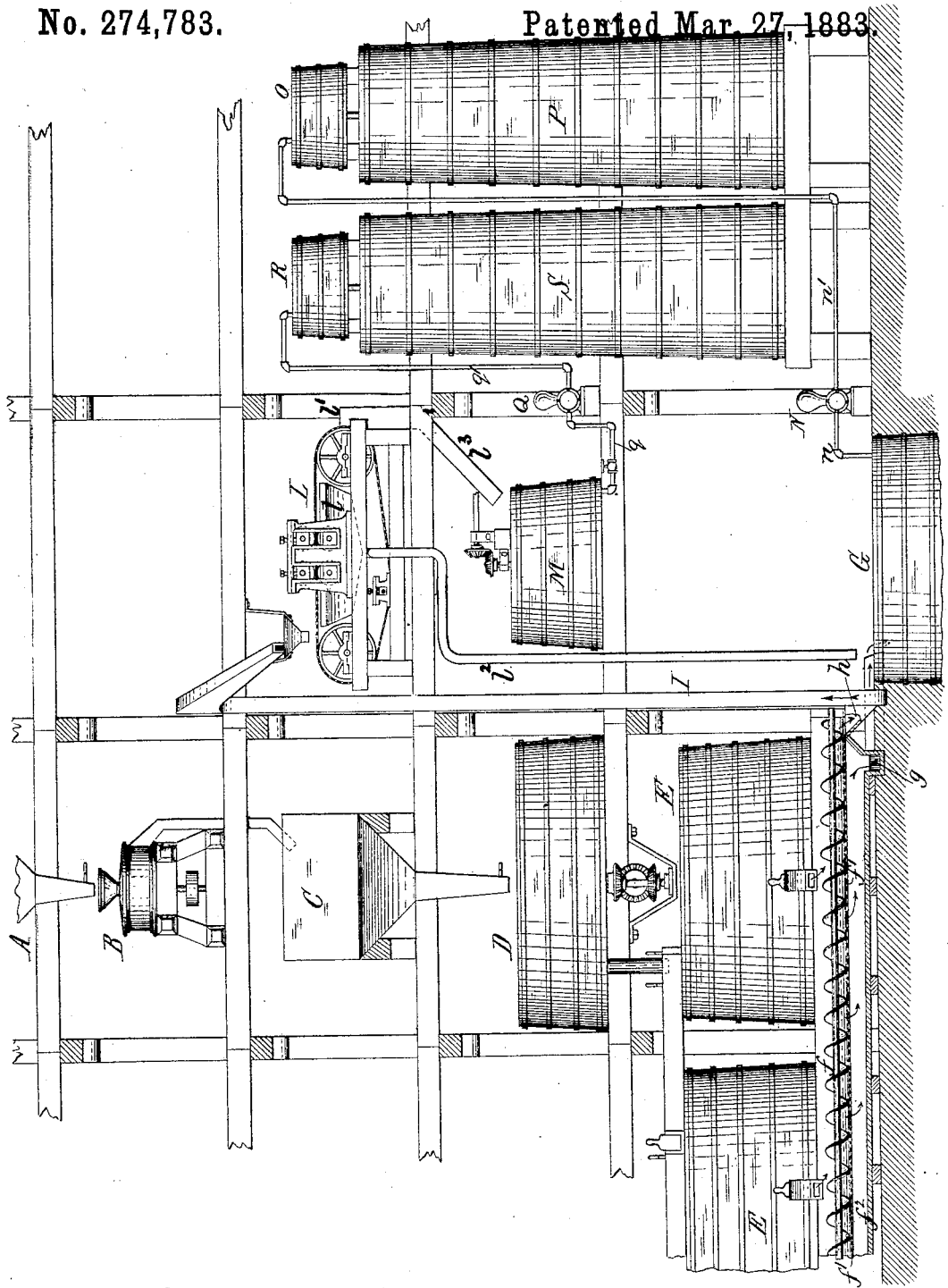
Chas. J. Buchheit
E. J. Brady
Witnesses.
Wm. T. Jebb, Inventor
by Wilhelm & Bonner
Attorneys.

UNITED STATES PATENT OFFICE.

WILLIAM T. JEBB, OF BUFFALO, NEW YORK.

PROCESS OF AND APPARATUS FOR MANUFACTURING DISTILLED SPIRITS FROM GRAIN.

SPECIFICATION forming part of Letters Patent No. 274,783, dated March 27, 1883.

Application filed February 24, 1882. (No model.)

*To all whom it may concern:*

Be it known that I, WILLIAM T. JEBB, of the city of Buffalo, in the county of Erie and State of New York, have invented a new and useful Improvement in Process of and Apparatus for Manufacturing Distilled Spirits from Grain, of which the following is a specification.

This invention relates to an improvement in the manufacture of alcoholic spirits from grain, whereby purer spirits are produced than by the method which is now generally practiced, and which latter consists in crushing, grinding, or otherwise reducing the grain, and then mashing, fermenting, and distilling all the constituent parts of the crushed or ground grain together, whereby the impurities or deleterious substances which are liberated during the process of distillation become mixed with the alcoholic spirits, from which they have to be removed by rectification and aging.

The object of the present invention is to produce spirits which are substantially free from the deleterious substances—such, for instance, as fusel-oil—which have their origin in the outer portions or husks of the kernels of grain, and which are generated or liberated from these portions of the grain during the process of distillation.

My invention consists, to that end, of the improved method and apparatus which will be hereinafter fully set forth, and pointed out in the claims.

In the accompanying drawing, which shows a partly-sectional elevation of a train of machinery which may be employed in carrying out my improved process, A represents the discharge-spout of a grain-bin, weigh-hopper, or other suitable receptacle, in which the grain to be worked up is received, and from which it passes to a grinding-mill, B, in which the grain is reduced to the proper degree of fineness. A roller-mill, disintegrating-mill, or other suitable reducing apparatus may, however, be employed instead of a grinding-mill, if preferred. The meal passes from the mill B to a receiver, C, which is a receiving-bin when the grain is reduced in a dry state, or a receiving tank or tub provided with a rotating stirrer or agitator when the grain is reduced in the presence of water.

D represents a mash-tub, of any ordinary and well-known construction, which receives the reduced grain from the bin or tub C, and in which the grain is mashed together with a suitable quantity of small grains or crushed malt, or in any other suitable and well-known manner.

E represents a suitable number of fermenting-tubs, which receive the mash from the tub D, and in which the fermentation is conducted in a well-known manner.

$f$ represents a screw conveyer arranged in a perforated trough, $f'$, which is placed below the fermenting-tubs, so as to receive the fermented material therefrom.

$f^2$ is an imperforate trough, which surrounds the lower side of the perforated trough $f'$. When the fermentation is complete the contents of the fermenting-tubs are drawn off into the trough $f'$. The liquid passes through the perforations of this trough into the trough $f^2$ below, while the bran, husks, and other coarse material are propelled by the conveyer-screw $f$ to the end of the trough $f'$, where they are delivered to the foot of an elevator, I. The liquid which has drained through the perforations of the trough $f'$ is conducted by the trough $f^2$ to a discharge spout, $g$, by which it is delivered to a receiving-tank, G. While the material passes through the trough $f'$ it is stirred and agitated by the screw $f$, whereby the separation of the liquid from the solid matter is greatly facilitated. Any other suitable machine for separating the liquid from the solid portions of the fermented material may, however, be employed—such, for instance, as shaking or revolving screens or sieves.

L represents a separating-machine, of any suitable and well-known construction, which receives the separated coarse material from the elevator I, and which serves to separate the liquid still contained in this coarse material from the same. A separating-machine which is well adapted for this purpose consists essentially of one or more pairs of pressure-rollers, between which the material is passed upon an endless apron of wire-cloth or other strong perforated material, and whereby the liquid is pressed out of the material, the liquid passing through the perforations of the endless apron into a collecting hopper or trough, $l$, below, while the dry offal escapes over the tail of the endless apron and passes into a hopper, $l'$. Any other suitable separating-machine—such, for instance, as a filter or centrifugal separator—may, however, be employed in the place of the squeezing-machine L, if preferred. The liquid which is obtained from the coarse material by the operation of the separator L is conducted by a pipe, $l^2$, to the receiving-vat G, while the dry offal passes through a spout, $l^3$, to a tub or vat, M. The liquid collected in the receiver G contains the bulk of the alcohol developed by the fermentation, and this fermented wash or beer is passed from the receiver G by a pump, N, and pipes $n\ n'$ to the charger O, from which it is delivered to the still P, in which the alcohol is distilled off in the usual manner. As the material in the still P does not contain any bran, husks, and other like matters, the spirits resulting from the distillation are free from the deleterious substances which are liberated from the bran, husks, and other coarse matters, when the latter are present in the material which is subjected to the process of distillation. The alcohol is also more readily distilled off, as it is not held back by the spongy coarse material which, in the ordinary method of manufacture, tends to retain a considerable portion of the alcohol. The distillation can therefore be carried on at a lower pressure and with less violence, whereby the liability of carrying impurities mechanically over into the worm by the violent ebullition of the material in the still is avoided. The dry offal collected in the tub M is therein mixed with water and the material thoroughly agitated by means of a rotating stirrer with which this tub is provided. If it should be found that this material contains unfermented starch, the material is delivered into a suitable fermenting-tub, in which the fermentation is completed. When there is no unfermented starch in the material contained in the tub M the material is charged by a pump, Q, and pipes $q\ q'$ into a charger, R, from which it is drawn into the still S, where the alcohol contained in this material is distilled off in a well-known manner. The spirits obtained from this material are more or less contaminated by deleterious substances liberated from the bran, &c., and should be kept separate from the purer spirits obtained from the separated liquid. By distilling the separated bran and other coarse material, as above described, the full yield of alcohol contained in the fermented material is obtained. If the separated bran and other coarse material can be more advantageously disposed of as feed for cattle, &c., the distillation of this part of the material will of course be omitted.

The fermenting-tubs E and the receiving-tub G may be provided with rotating stirrers, or other suitable agitators, to prevent valuable material from settling and remaining on the bottoms of these tubs.

I claim as my invention—

1. The herein-described method of manufacturing distilled spirits from grain, which consists in fermenting the grain, then separating the bran, husks, and other coarse portions of the fermented material from the liquid portions thereof, and then distilling the separated liquid and the separated coarse material separately, substantially as set forth.

2. In an apparatus for manufacturing distilled spirits from grain, the combination, with one or more fermenting-tubs in which the grain is fermented, of a separating-machine whereby the bran and other coarse portions of the fermented material are separated from the liquid portions thereof, mechanism whereby the separated bran and other coarse material are automatically removed, a receiver in which the separated liquid is collected, and a still in which the liquid is distilled, substantially as set forth.

3. In an apparatus for manufacturing distilled spirits from grain, the combination, with one or more fermenting-tubs in which the grain is fermented, of a separating-machine whereby the bran and other coarse portions of the fermented material are separated from the liquid portion thereof, a receiver in which the separated liquid is collected, a mixing-tub in which the separated bran and other coarse material is mixed with water, and a still or stills in which the separated liquid and the separated coarse material are distilled separately, substantially as set forth.

4. In an apparatus for manufacturing distilled spirits from grain, the combination, with one or more fermenting-tubs in which the grain is fermented, of a separating-machine whereby the coarse portions of the fermented material are separated from the liquid portions thereof, a supplementary separator by which the liquid still contained in the coarse material is separated therefrom, a receiver in which the separated liquid is collected, and a still in which the liquid is distilled, substantially as set forth.

WILLIAM T. JEBB.

Witnesses:
EDWARD WILHELM,
JOHN TULLY.